US012387705B2

(12) United States Patent
Zhao et al.

(10) Patent No.: US 12,387,705 B2
(45) Date of Patent: Aug. 12, 2025

(54) THIN-LAYER LOW-FREQUENCY UNDERWATER SOUND INSULATION METAMATERIAL

(71) Applicant: National University of Defense Technology, Changsha (CN)

(72) Inventors: Honggang Zhao, Changsha (CN); Yang Wang, Changsha (CN); Chao Wang, Changsha (CN); Junhui Cao, Changsha (CN); Jihong Wen, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 43 days.

(21) Appl. No.: 17/999,800

(22) PCT Filed: Apr. 21, 2022

(86) PCT No.: PCT/CN2022/088212
§ 371 (c)(1),
(2) Date: Nov. 23, 2022

(87) PCT Pub. No.: WO2022/228269
PCT Pub. Date: Nov. 3, 2022

(65) Prior Publication Data
US 2024/0046908 A1 Feb. 8, 2024

(30) Foreign Application Priority Data
Apr. 28, 2021 (CN) ......................... 202110464415.4

(51) Int. Cl.
*G10K 11/168* (2006.01)

(52) U.S. Cl.
CPC .................................. *G10K 11/168* (2013.01)

(58) Field of Classification Search
CPC ................................ G10K 11/168; E04B 1/86
(Continued)

(56) References Cited

U.S. PATENT DOCUMENTS 8,662,249 B2 * 3/2014 Nair ..................... G10K 11/168 181/290
8,789,652 B2 * 7/2014 Swallowe ............ G10K 11/172 181/295
(Continued)

FOREIGN PATENT DOCUMENTS

CN 111696503 A * 9/2020 ........... B32B 15/043
WO WO-2020208323 A1 * 10/2020 .............. F16F 7/108

*Primary Examiner* — Forrest M Phillips
(74) *Attorney, Agent, or Firm* — Knobbe, Martens, Olson & Bear LLP

(57) ABSTRACT

The present disclosure provides a thin-layer low-frequency underwater sound insulation metamaterial, including two cover plates and a sound insulation layer. The sound insulation layer is composed of sound insulation components arranged in an array periodically. The sound insulation components each include a sound insulation unit and four connecting units. The sound insulation unit is of a hollow rectangular column structure. The four connecting units are arranged at four corners of the sound insulation unit. Every two adjacent sound insulation units are connected through the connecting units. A long side wall of the sound insulation unit and the corresponding cover plate have an included angle of 0-90°. The metamaterial can obtain a smaller equivalent acoustic impedance in propagation direction of acoustic waves, and compared with a sound insulation material of a square honeycomb structure with the same thickness, the metamaterial has greatly improved sound insulation performance.

19 Claims, 7 Drawing Sheets

(58) Field of Classification Search
USPC ........................................................ 181/284
See application file for complete search history.

(56) References Cited

U.S. PATENT DOCUMENTS

| | | | | |
|---|---|---|---|---|
| 9,624,674 | B2 * | 4/2017 | Lee | E01D 19/103 |
| 10,410,617 | B2 * | 9/2019 | Roberts | H04R 1/2888 |
| 11,136,734 | B2 * | 10/2021 | Thota | E01F 8/0041 |
| 11,204,204 | B2 * | 12/2021 | Lee | F01N 1/023 |
| 11,732,467 | B2 * | 8/2023 | Fishman | G10K 11/172 181/290 |

* cited by examiner

THIN-LAYER LOW-FREQUENCY UNDERWATER SOUND INSULATION METAMATERIAL

CROSS REFERENCE TO RELATED APPLICATION

The present application is a U.S. National Phase application of PCT International Application Number PCT/CN2022/088212, filed on Apr. 21, 2022, which claims priority to the Chinese Patent Application No. CN202110464415.4, filed with China National Intellectual Property Administration (CNIPA) on Apr. 28, 2021, and entitled "THIN-LAYER LOW-FREQUENCY UNDERWATER SOUND INSULATION METAMATERIAL", which is incorporated herein by reference in its entirety.

TECHNICAL FIELD

The present disclosure relates to the technical field of vibration and noise control of underwater equipment, and in particular, to a thin-layer low-frequency underwater sound insulation metamaterial.

BACKGROUND ART

Applying sound insulation materials on the surface of underwater equipment is an important technology that can suppress the radiated noise of the equipment and improve its acoustic stealth performance. The sound insulation mechanism of the sound insulation materials mainly includes the following two aspects: (1) Damping dissipation sound insulation: The energy of the equipment radiating acoustic waves to the outside is reduced by means of the vibration damping dissipation inside the material or the absorption of scattered acoustic waves. (2) Impedance mismatch sound insulation: by designing the acoustic structure, the internal noise of the equipment is strongly reflected on the surface of the sound insulation material, thereby reducing the transmitted acoustic wave energy.

The sound insulation material laid on the surface of the underwater equipment can effectively block the outward propagation path of the internal noise of the equipment, and reduce the radiated noise of the equipment itself, so as to achieve "quietness". With the continuous development of the working frequency of a detection sonar to low frequency, the effective working frequency of existing sound insulation materials is high, which cannot meet the needs of low-frequency applications. Designing sound insulation materials that can effectively block low-frequency (200-2,000 Hz) underwater acoustic waves is of great significance to the development of acoustic stealth technology for the underwater equipment.

SUMMARY

In view of the above-mentioned deficiencies of the low-frequency performance of the existing underwater sound insulation materials, based on the quasi-static impedance mismatch mechanism and the density-based topology optimization method, the present disclosure designs a thin-layer low-frequency underwater sound insulation metamaterial, which can effectively improve the sound insulation in a low-frequency band of 200-2,000 Hz.

To achieve the above objectives, the present disclosure provides a thin-layer low-frequency underwater sound insulation metamaterial, including two cover plates and a sound insulation layer located between the two cover plates.

The two cover plates are parallel to each other, and the sound insulation layer is composed of m×n sound insulation components arranged in an array periodically, where $m \geq 1$, and $n \geq 1$.

The sound insulation components each include a sound insulation unit and four connecting units. The sound insulation unit is of a hollow rectangular column structure. The four connecting units are arranged at four corners of the sound insulation unit. Every two adjacent sound insulation units are connected through the connecting units.

A long side wall of the sound insulation unit and the corresponding cover plate have an included angle of 0-90°.

In one of the embodiments, the connecting units may each include an extension portion and a connecting portion. One end of the extension portion may be connected to the sound insulation unit. The connecting portion may be provided at the other end of the extension portion.

Every two adjacent sound insulation units may be connected by the connecting portions, and the extension portion, the connecting portion, and the long side wall of the sound insulation unit may constitute a "Z"-shaped structure.

In one of the embodiments, an outer profile of the long side wall of the sound insulation unit may be a first profile, and an outer profile of a short side wall of the sound insulation unit may be the second profile.

The extension portion may have a third profile and a fourth profile. The first profile may be connected to one end of the third profile through a first transition profile. The second profile may be connected to one end of the fourth profile through the second transition profile.

The first profile and the third profile may have a topological angle of α3, and the second profile and the fourth profile may have a topological angle of α1, where $$\alpha 3 = \frac{1}{2}\alpha 1.$$

In one of the embodiments, the connecting portion may have a fifth profile, a sixth profile, a seventh profile, an eighth profile, and a ninth profile that are connected in sequence.

The fifth profile may be connected to the other end of the third profile, and the ninth profile may be connected to the other end of the fourth profile through a third transition profile.

The sixth profile may be perpendicular to the fifth profile. The seventh profile may be perpendicular to the sixth profile. The eighth profile may be perpendicular to the seventh profile.

The ninth profile and the sixth profile may have a topological angle of α2, where $$\alpha 2 = \frac{1}{4}\alpha 1.$$

In one of the embodiments, a section of the sound insulation unit parallel to the long side wall and passing through the axis of the sound insulation unit may be a first section, and a section of the sound insulation unit parallel to the short side wall and passing through the axis of the sound insulation unit may be a second section.

A distance between the first section and the sixth profile may be a1. The seventh profile may have a width of a2, and the fifth profile may have a width of a3, where $$a2 = \frac{1}{5}a1,$$

and 0≤a3≤0.25 mm.

A distance between the second section and the seventh profile may be b1. The sixth profile may have a length of b2, and the eighth profile may have a length of b3, where $$b2\frac{4}{5}b1, \text{ and } b3 = \frac{1}{5}b1.$$

In one of the embodiments, the long side wall of the sound insulation unit may have a thickness of a4 and the short side wall of the sound insulation unit may have a thickness of b4, where $$a4 = \frac{1}{10}a1, \text{ and } b4 = \frac{1}{10}b1.$$

In one of the embodiments, the cover plates may each have a thickness greater than or equal to 0.1 mm.

In one of the embodiments, the cover plates and the sound insulation layer may be made of metal or non-metal materials with physical parameters as follows:

a range of an elastic modulus E satisfies 0.1 GPa≤E≤220 GPa, a range of a Poisson's ratio η satisfies 0.2≤η≤0.5, and a range of a density ρ satisfies 800 kg/m$^3$≤ρ≤12,000 kg/m$^3$.

The thin-layer low-frequency underwater sound insulation metamaterial provided by the present disclosure is designed based on the quasi-static impedance mismatch mechanism and the density-based topology optimization method, which can effectively solve the sound insulation problem in a low-frequency band of 200-2,000 Hz. The internal microstructure of the metamaterial has the characteristic of negative Poisson's ratio. Under the condition of a thickness not greater than 20 mm, the low-frequency broadband sound insulation performance of acoustic wave at 200-2,000 Hz can be realized. The metamaterial can be applied to noise control in underwater equipment and other fields, and has an excellent engineering application prospect.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and those of ordinary skill in the art may still derive other drawings from these accompanying drawings without creative efforts.

Figure 1:
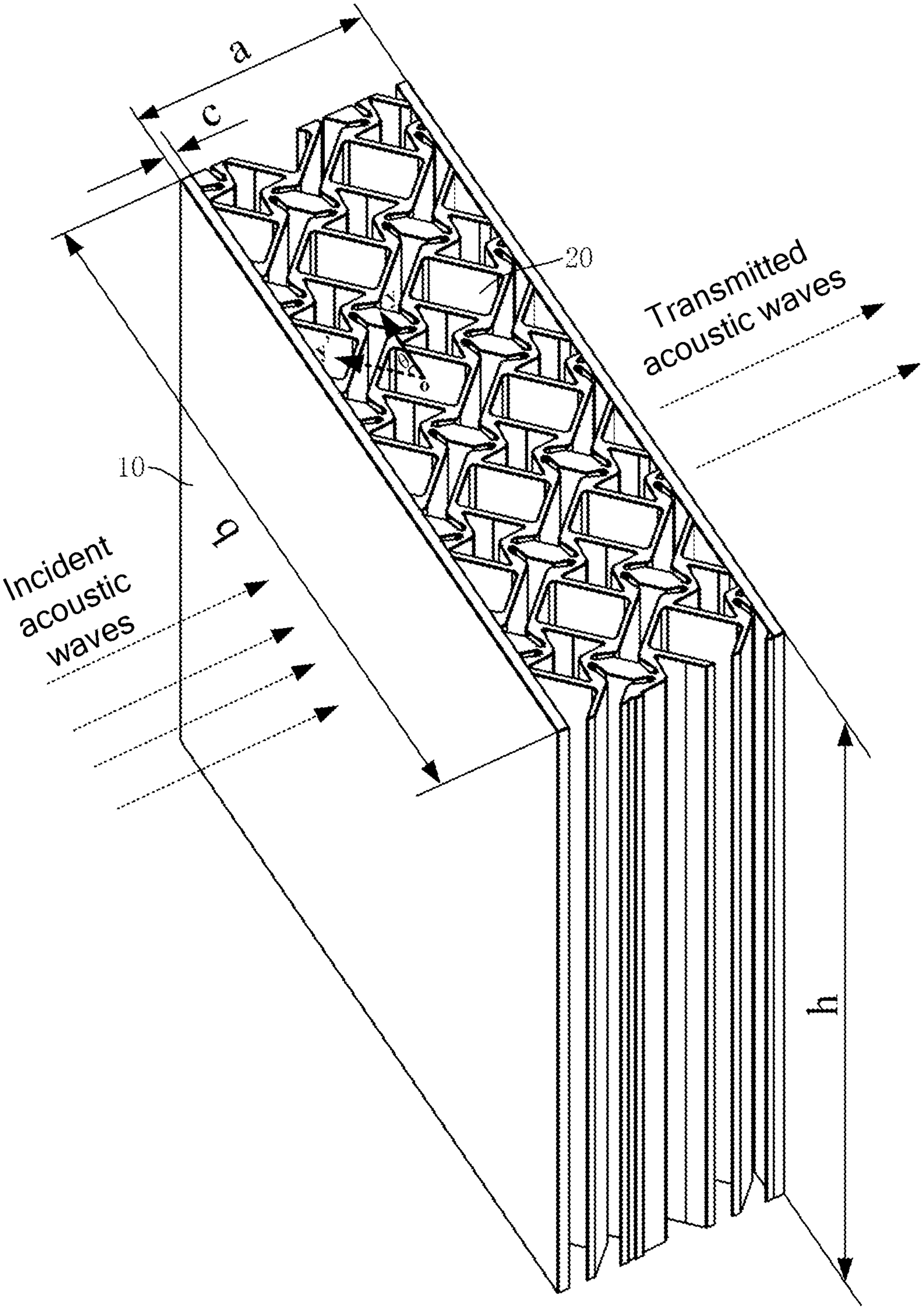
FIG. 1 shows an overall structure of a thin-layer low-frequency underwater sound insulation metamaterial in an embodiment of the present disclosure.
Figure 2:
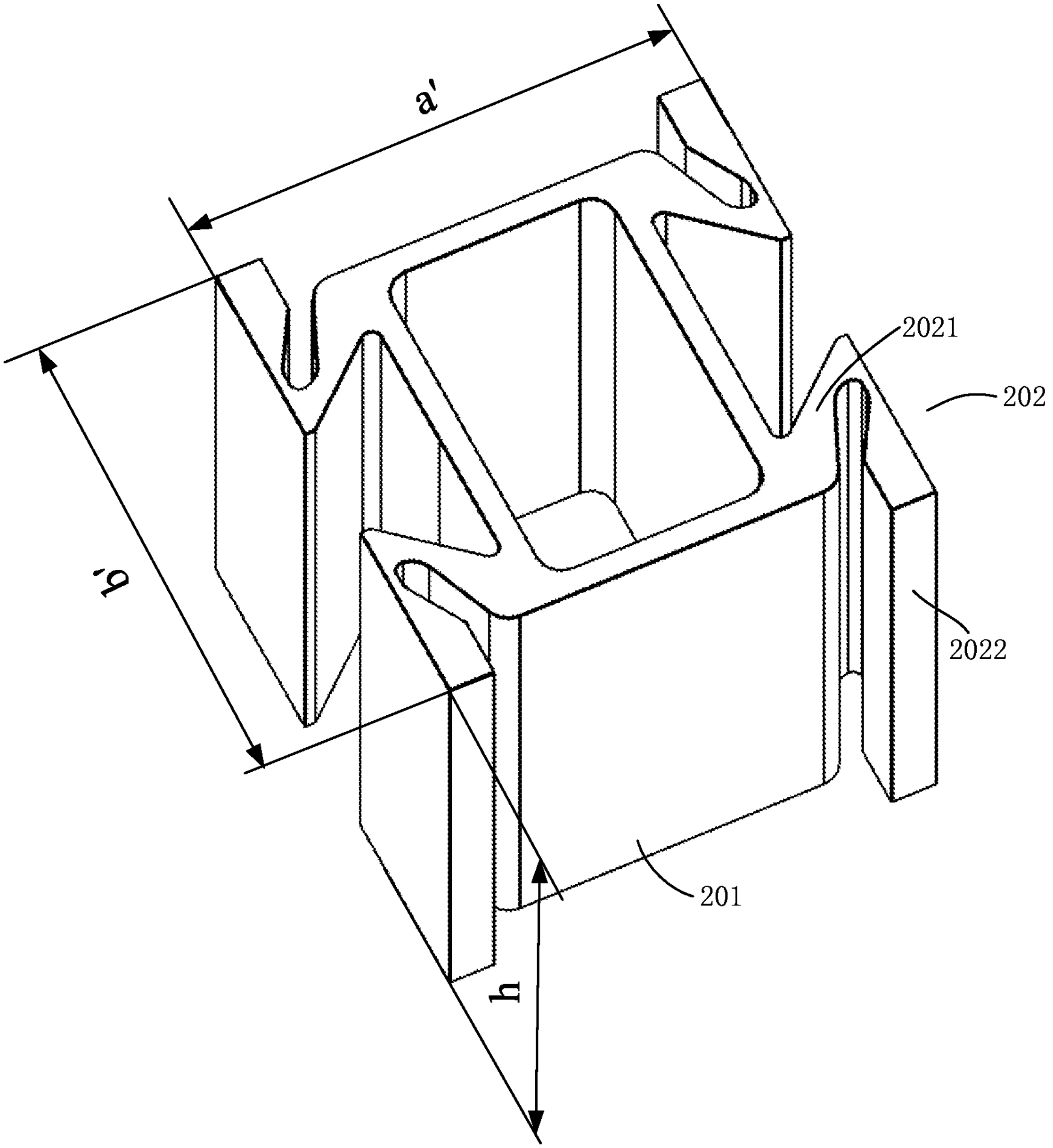
FIG. 2 shows a structure of a sound insulation component in the embodiment of the present disclosure.
Figure 3:
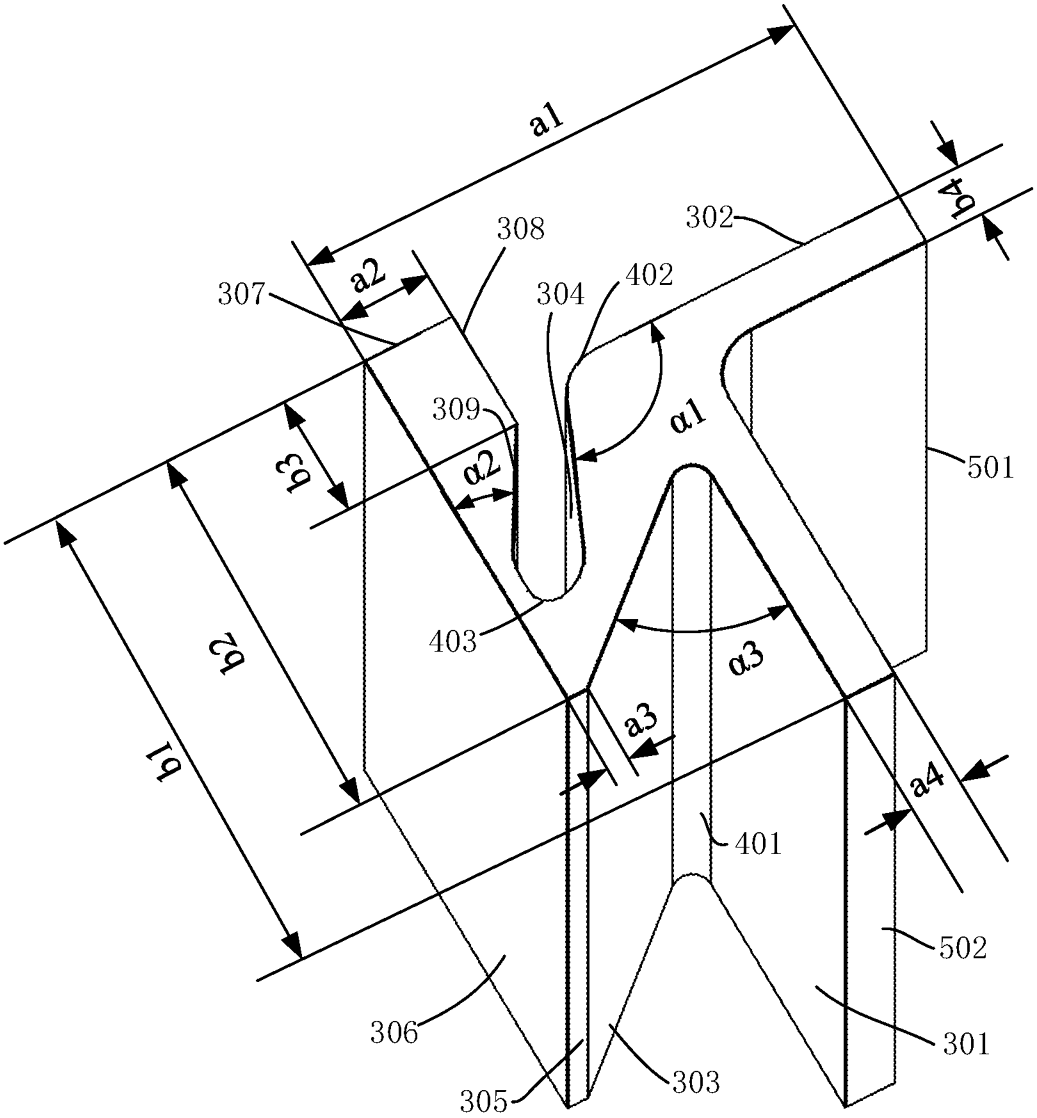
FIG. 3 shows a structure of ¼ of the sound insulation component in the embodiment of the present disclosure.
Figure 4:
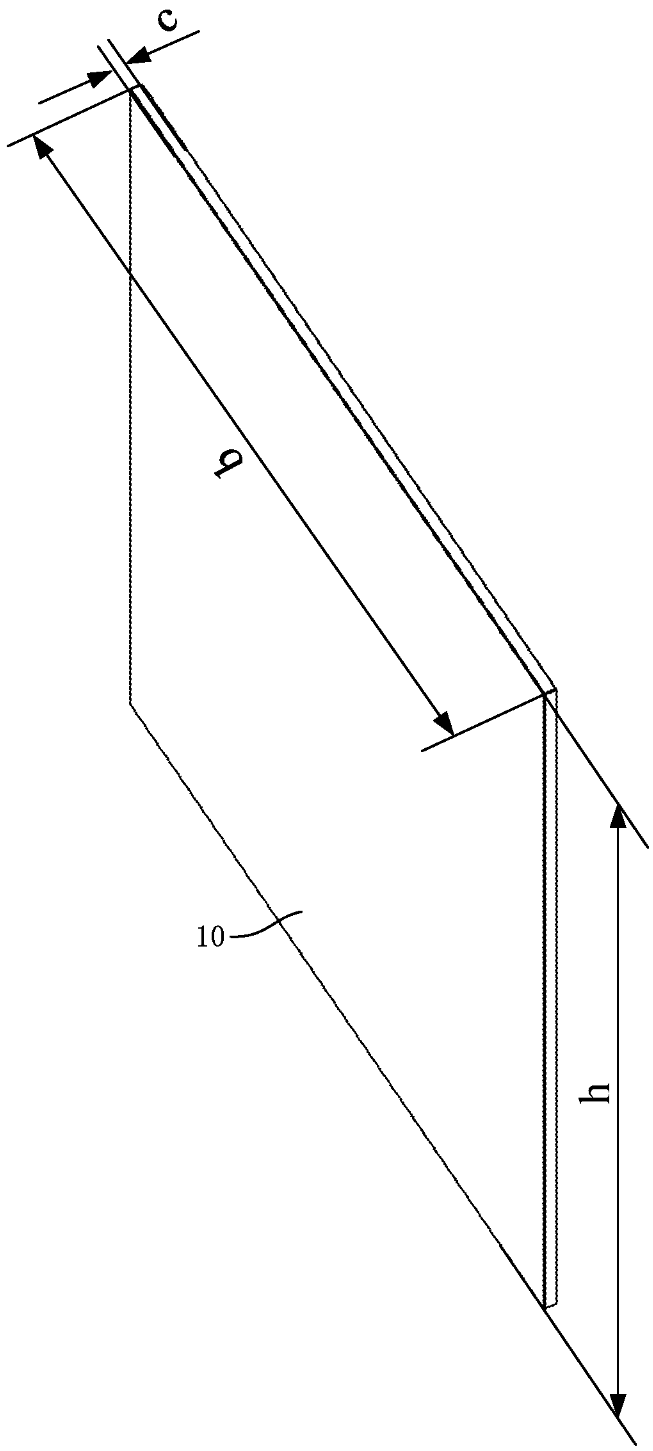
FIG. 4 shows a structure of a rectangular cover plate in the embodiment of the present disclosure.

Reference Numerals: cover plate 10, sound insulation layer 20, sound insulation unit 201, connecting unit 202, extension portion 2021, connecting portion 2022, first profile 301, second profile 302, third profile 303, fourth profile 304, fifth profile 305, sixth profile 306, seventh profile 307, eighth profile 308, ninth profile 309, first transition profile 401, second transition profile 402, third transition profile 403, first section 501, and second section 502.

The implementation of objectives, functional features, and advantages of the present disclosure will be further described with reference to the accompanying drawings and the embodiments.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

It should be noted that all the directional indications (such as upper, lower, left, right, front, and rear) in the embodiments of the present disclosure are merely used to explain relative position relationships, motion situations, and the like of the components in a specific gesture (as shown in the figures). If the specific gesture changes, the directional indication also changes accordingly.

Moreover, the terms such as "first" and "second" used herein are only for the purpose of description and are not intended to indicate or imply relative importance, or implicitly indicate the number of the indicated technical features. Thus, features limited by "first" and "second" may expressly or implicitly include at least one of that feature. In description of the present disclosure, "a plurality of" means at least two, for example, two or three, unless otherwise clearly and specifically limited.

In the present disclosure, unless otherwise specified and defined, the terms such as "connection" and "fixation" should be comprehended in a broad sense. For example, "fixation" may be a fixed connection, a detachable connection, or an integral formation; or a direct connection, or an indirect connection through an intermediate medium, or internal communication between two elements, or an interactive relationship between two elements, unless otherwise clearly and specifically limited. Those of ordinary skill in the art may understand specific meanings of the above terms in the present disclosure based on a specific situation.

Furthermore, the technical solutions between the various embodiments of the present disclosure may be combined with each other, but must be on the basis that the combination thereof can be implemented by those of ordinary skill in the art. In case of a contradiction with the combination of the technical solutions or a failure to implement the combination, it should be considered that the combination of the technical solutions does not exist, and is not within the protection scope of the present disclosure.

FIG. 1 to FIG. 4 show a thin-layer low-frequency underwater sound insulation metamaterial disclosed by the embodiment of the present disclosure, which specifically includes two cover plates 10 and a sound insulation layer 20 located between the two cover plates 10. The two cover plates 10 are parallel to each other, and the sound insulation layer 20 is composed of m×n sound insulation components arranged in an array periodically, where m≥1, and n≥1. Specifically, the sound insulation components each include a sound insulation unit 201 and four connecting units 202. The sound insulation unit 201 is of a hollow rectangular column structure. The four connecting units 202 are arranged at four corners of the sound insulation unit 201. The four connecting units 202 are distributed symmetrically in a cross on the sound insulation unit 201. Every two adjacent sound insulation units 201 are connected through the connecting units 202. A long side wall of the sound insulation unit 201 and the corresponding cover plate 10 have an included angle of 0-90°. The long side wall of the sound insulation unit 201 refers to a side wall where a long side of the sound insulation unit 201 is located.

In the present embodiment, the connecting units 202 each include an extension portion 2021 and a connecting portion 2022. One end of the extension portion 2021 is connected to the sound insulation unit 201. The connecting portion 2022 is provided at the other end of the extension portion 2021. When two adjacent sound insulation units 201 are connected, their corresponding connecting portions 2022 are fixedly connected, that is, every two adjacent sound insulation units 201 are connected by the connecting portions 2022, and the extension portion 2021, the connecting portion 2022, and the long side wall of the sound insulation unit 201 constitute a "Z"-shaped structure.

Further, specifically, an outer profile of the long side wall of the sound insulation unit 201 is the first profile 301. An outer profile of a short side wall of the sound insulation unit 201 is the second profile 302. The short side wall of the sound insulation unit 201 refers to a side wall where a short side of the sound insulation unit 201 is located. The extension portion 2021 has a third profile 303 and a fourth profile 304. The first profile 301 is connected to one end of the third profile 303 through a first transition profile 401. The second profile 302 is connected to one end of the fourth profile 304 through a second transition profile 402. The first profile 301 and the third profile 303 have a topological angle of α3, and the second profile 302 and the fourth profile 304 have a topological angle of α1, where $$\alpha 3 = \frac{1}{2}\alpha 1.$$

The connecting portion 2022 has a fifth profile 305, a sixth profile 306, a seventh profile 307, an eighth profile 308, and a ninth profile 309 that are connected in sequence. The fifth profile 305 is connected to the other end of the third profile 303. The ninth profile 309 is connected to the other end of the fourth profile 304 through a third transition profile 403. The sixth profile 306 is perpendicular to the fifth profile 305. The seventh profile 307 is perpendicular to the sixth profile 306. The eighth profile 308 is perpendicular to the seventh profile 307. The ninth profile 309 and the sixth profile 306 has a topological angle of α2, where $$\alpha 2 = \frac{1}{4}\alpha 1.$$

Preferably, all of the first transition profile 401, the second transition profile 402, and the third transition profile 403 are arc transition surfaces. When two adjacent sound insulation units 201 are connected, the two sixth profiles 306 or the two seventh profiles 307 in their corresponding connecting portions 2022 are connected, that is, one connecting portion is connected to at most two other connecting portions, and one sound insulation component is connected to at most eight adjacent sound insulation components.

In the present embodiment, a section of the sound insulation unit 201 parallel to the long side wall and passing through an axis of the sound insulation unit 201 is a first section 501, and a section of the sound insulation unit 201 parallel to the short side wall and passing through the axis of the sound insulation unit 201 is a second section 502. A distance between the first section 501 and the sixth profile 306 is a1, the seventh profile 307 has a width of α2, and the fifth profile 305 has a width of a3, where $$a2 = \frac{1}{5}a1,$$

and 0≤a3≤0.25 mm. A distance between the second section 502 and the fifth profile 307 is b1, the sixth profile 306 has a length of b2, and the eighth profile 308 has a length of b3, where $$b2 = \frac{4}{5}b1, \text{ and } b3 = \frac{1}{5}b1.$$

The long side wall of the sound insulation unit 201 has a thickness of a4, and the short side wall of the sound insulation unit 201 has a thickness of b4, where $$a4 = \frac{1}{10}a1, \text{ and } b4 = \frac{1}{10}b1.$$

In the present embodiment, the cover plate 10 is a rectangular plate structure, and its length and width are equal to those of the sound insulation layer 20. The cover plates 10 each have a thickness greater than or equal to 0.1 mm.

In the present embodiment, the cover plates 10 and the sound insulation layer 20 are made of metal materials or non-metal materials. The metal materials may be selected from aluminum, carbon steel, and alloy steel, and the non-metal materials may be selected from polylactic acid or acrylonitrile butadiene styrene (ABS). The materials have physical parameters as follows: a range of an elastic modulus E satisfies 0.1 GPa≤E≤220 GPa, a range of a Poisson's ratio $\eta$ satisfies $0.2 \leq \eta \leq 0.5$, and a range of a density $\rho$ satisfies 800 $kg/m^3 \leq \rho \leq 12{,}000$ $kg/m^3$.

In the present embodiment, the cover plates 10 and the sound insulation layer 20 may be integrally printed and manufactured using a three-dimensional (3D) printing technology, or may be manufactured by machining modes such as wire cut electrical discharge machining (WEDM).

Figure 5:
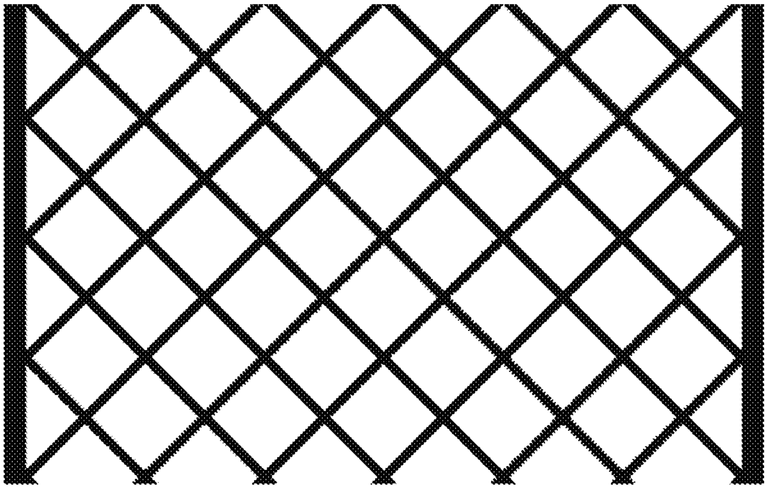
FIG. 5 shows a traditional sound insulation material of a square honeycomb structure in the simulation example of the embodiment of the present disclosure.

Combined with a specific simulation example, the thin-layer low-frequency underwater sound insulation metamaterial in the present embodiment is compared with a traditional sound insulation material of a square honeycomb structure in FIG. 5, so as to further explain the thin-layer low-frequency underwater sound insulation metamaterial in the present embodiment.

Figure 6:
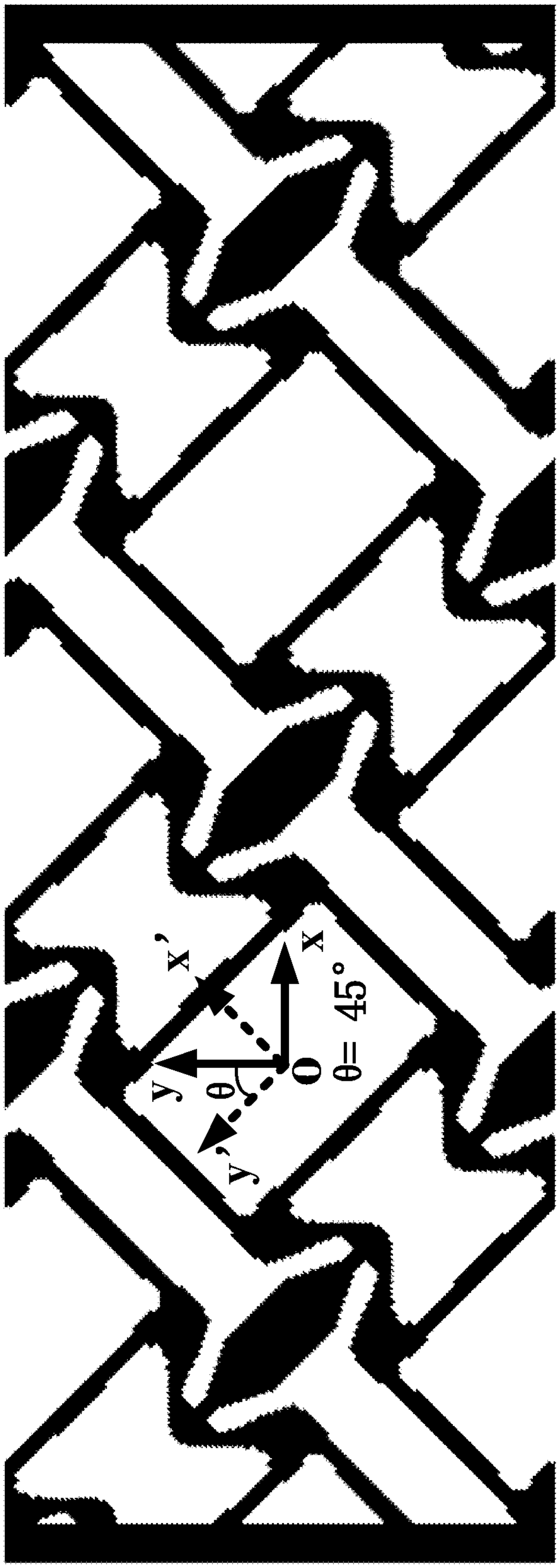
FIG. 6 shows a partial structure of a thin-layer low-frequency underwater sound insulation metamaterial in the simulation example of the embodiment of the present disclosure.

In this example, both a cover plate 10 and a sound insulation layer 20 are made of polylactic acid. The material has parameters as follows: a Young's modulus of 0.8 GPa, a Poisson's ratio of 0.38, and a density of 1,200 $kg/m^3$. A long side wall of the sound insulation unit 201 and the corresponding cover plate 10 have an included angle $\theta$ of 450 as shown in FIG. 6. The cover plate 10 has a length of b=10 cm, a width of h=10 cm, and a thickness of c=0.5 mm. The thin-layer low-frequency underwater sound insulation metamaterial has a total thickness of a=20 mm, a width of b=10 cm, and a height of h=10 cm. A sound insulation component has a length of a'=5 mm, a width of b'=5 mm, and n height of h=10 mm. A distance between the above 1 first section 501 and the sixth profile 306 is $$a1 = \frac{1}{2}a' = 2.5 \text{ mm.}$$

The seventh profile 307 has a width of $$a2 = \frac{1}{5}a1 = 0.5 \text{ mm.}$$

The fifth profile 305 has a width of a3=0.1 mm. The long side wall of the sound insulation unit 201 has a thickness of $$a4 = \frac{1}{10}a1 = 0.25 \text{ mm.}$$

A distance between the second section 502 and the fifth profile 307 is $$b1 = \frac{1}{2}b' = 2.5 \text{ mm.}$$

The sixth profile 306 has a length of $$b2 = \frac{4}{s}b1 = 2 \text{ mm.}$$

The eighth profile 308 has a length of $$b3 = \frac{1}{5}b1 = 0.5 \text{ mm.}$$

The short side wall of the sound insulation unit 201 has a thickness of $$b4 = \frac{1}{10}b1 = 0.25 \text{ mm.}$$

The first profile 301 and the third profile 303 have a topological angle of $\alpha3=55°$. The second profile 302 and the fourth profile 304 have a topological angle of $\alpha1=2\alpha3=110°$. The ninth profile 309 and the sixth profile 306 have a topological angle of $$\alpha2 = \frac{1}{4}\alpha1 = 27.5°$$

Figure 7:
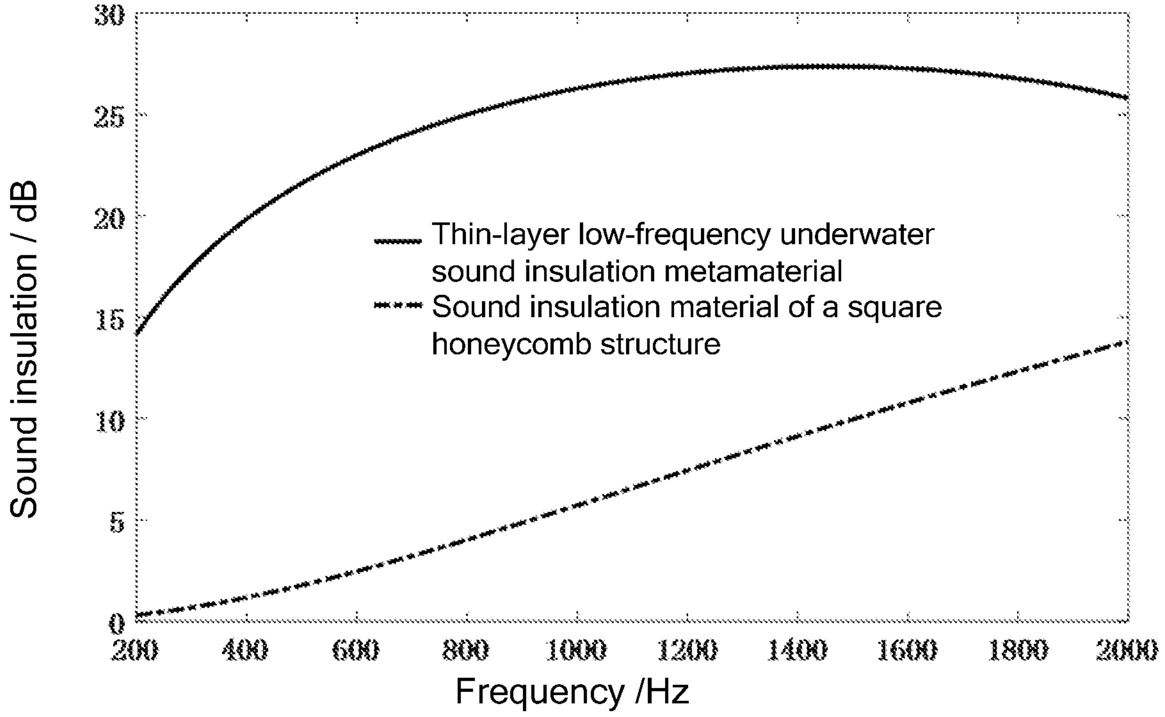
FIG. 7 is a comparison diagram of a sound insulation coefficients of the traditional sound insulation material of a square honeycomb structure and the thin-layer low-frequency underwater sound insulation metamaterial in the embodiment of the present disclosure in a frequency range of 200-2,000 Hz.

According to the above dimensional parameters, a finite element analysis model of the sound insulation performance of the material is established, and a sound insulation coefficient obtained from the simulation is shown in FIG. 7. FIG. 7 compares the sound insulation coefficients of the traditional sound insulation material of a square honeycomb structure and the thin-layer low-frequency underwater sound insulation metamaterial in the present embodiment under the same material and overall thickness. It can be seen from FIG. 7 that in the embodiment of the present disclosure, the metamaterial has an average sound insulation greater than 20 dB in the frequency range of 200-2,000 Hz under the condition that the overall thickness is only 20 mm, and has excellent sound insulation. Compared with the traditional sound insulation material of a square honeycomb structure, the thin-layer underwater sound insulation metamaterial in the present embodiment has greatly improved sound insulation performance.

To sum up, the technical effects of the thin-layer low-frequency underwater sound insulation metamaterial in the present embodiment are as follows:

1. It has excellent low-frequency sound insulation performance. Compared with the traditional sound insulation material of a square honeycomb structure, the thin-layer low-frequency underwater sound insulation metamaterial has an average sound insulation greater than 20 dB in the frequency range of 200-2,000 Hz under the condition that the overall thickness is only 20 mm, achieving low-frequency high-efficient sound insulation.
2. It has excellent mechanical properties and lightweight properties. The thin-layer low-frequency underwater sound insulation metamaterial has negative Poisson's ratio and excellent bending resistance, and the thin-layer low-frequency underwater sound insulation metamaterial in the embodiment is a lightweight structure with an overall average density of less than 350 $kg/m^3$.
3. The sound insulation material in the present embodiment has excellent structural design. By optimizing and adjusting the length, width and height of the sound insulation component, as well as the topological angle and manufacturing materials, it can meet the requirements of sound insulation and mechanical properties in different practical applications.

The foregoing are merely preferred embodiments of the present disclosure, and the scope of the present disclosure is not limited thereto. Any equivalent structure change made using the content of the specification of the present disclosure and the accompanying drawings under the inventive concept of the present disclosure, or direct/indirect application thereof in other related technical fields, shall fall within the protection scope of the present disclosure.

What is claimed is:

1. A thin-layer low-frequency underwater sound insulation metamaterial, comprising two cover plates and a sound insulation layer located between the two cover plates, wherein:

the two cover plates are parallel to each other, and the sound insulation layer is composed of m×n sound insulation components arranged in an array periodically, wherein m≥1, and n≥1;

the sound insulation components each comprise a sound insulation unit and four connecting units, wherein the sound insulation unit is of a hollow rectangular column structure, the four connecting units are arranged at four corners of the sound insulation unit, and every two adjacent sound insulation units are connected through the connecting units;

a long side wall of the sound insulation unit and the corresponding cover plate have an included angle of 0-90°, and wherein each of the connecting units comprises an extension portion and a connecting portion, wherein a first end of the extension portion is connected to the sound insulation unit, and the connecting portion is provided at a second end of the extension portion; and the every two adjacent sound insulation units are connected by the connecting portions and the extension portion, wherein the connecting portion and the long side wall of the sound insulation unit constitute a "Z"-shaped structure.

2. The thin-layer low-frequency underwater sound insulation metamaterial according to claim 1, wherein the four connecting units are distributed symmetrically in a cross on the sound insulation unit.

3. The thin-layer low-frequency underwater sound insulation metamaterial according to claim 1, wherein an outer profile of the long side wall of the sound insulation unit is a first profile, and an outer profile of a short side wall of the sound insulation unit is a second profile;

the extension portion has a third profile and a fourth profile, the first profile is connected to one end of the third profile through a first transition profile, and the second profile is connected to one end of the fourth profile through a second transition profile; and the first profile and the third profile have a topological angle of α3, and the second profile and the fourth profile have a topological angle of α1, wherein $$\alpha 3 = \frac{1}{2}\alpha 1.$$

4. The thin-layer low-frequency underwater sound insulation metamaterial according to claim 3, wherein the connecting portion has a fifth profile, a sixth profile, a seventh profile, an eighth profile, and a ninth profile that are connected in sequence;

the fifth profile is connected to the other end of the third profile, and the ninth profile is connected to the other end of the fourth profile through a third transition profile;

the sixth profile is perpendicular to the fifth profile, the seventh profile is perpendicular to the sixth profile, and the eighth profile is perpendicular to the seventh profile; and the ninth profile and the sixth profile have a topological angle of α2, wherein $$\alpha 2 = \frac{1}{4}\alpha 1.$$

5. The thin-layer low-frequency underwater sound insulation metamaterial according to claim 4, wherein the first transition profile, the second transition profile, and the third transition profile are arc transition surfaces.

6. The thin-layer low-frequency underwater sound insulation metamaterial according to claim 4, wherein a section of the sound insulation unit parallel to the long side wall and passing through an axis of the sound insulation unit is a first section, and a section of the sound insulation unit parallel to the short side wall and passing through the axis of the sound insulation unit is a second section;

a distance between the first section and the sixth profile is a1, the seventh profile has a width of a2, and the fifth profile has a width of a3, wherein $$a2 = \frac{1}{5}a1,$$

and 0≤a3≤0.25 mm; and a distance between the second section and the seventh profile is b1, the sixth profile has a length of b2, and the eighth profile has a length of b3, wherein $$b2 = \frac{4}{5}b1, \text{ and } b3 = \frac{1}{5}b1.$$

7. The thin-layer low-frequency underwater sound insulation metamaterial according to claim 6, wherein the long side wall of the sound insulation unit has a thickness of a4, and the short side wall of the sound insulation unit has a thickness of b4, wherein $a4=\frac{1}{10}a1$, and $b4=\frac{1}{10}b1$.

8. The thin-layer low-frequency underwater sound insulation metamaterial according to claim 1, wherein the cover plates each have a thickness greater than or equal to 0.1 mm.

9. The thin-layer low-frequency underwater sound insulation metamaterial according to claim 2, wherein the cover plates each have a thickness greater than or equal to 0.1 mm.

10. The thin-layer low-frequency underwater sound insulation metamaterial according to claim 1, wherein the cover plates each have a thickness greater than or equal to 0.1 mm.

11. The thin-layer low-frequency underwater sound insulation metamaterial according to claim 3, wherein the cover plates each have a thickness greater than or equal to 0.1 mm.

12. The thin-layer low-frequency underwater sound insulation metamaterial according to claim 4, wherein the cover plates each have a thickness greater than or equal to 0.1 mm.

13. The thin-layer low-frequency underwater sound insulation metamaterial according to claim 5, wherein the cover plates each have a thickness greater than or equal to 0.1 mm.

14. The thin-layer low-frequency underwater sound insulation metamaterial according to claim 6, wherein the cover plates each have a thickness greater than or equal to 0.1 mm.

15. The thin-layer low-frequency underwater sound insulation metamaterial according to claim 7, wherein the cover plates each have a thickness greater than or equal to 0.1 mm.

16. The thin-layer low-frequency underwater sound insulation metamaterial according to claim 1, wherein the cover plates and the sound insulation layer are made of metal materials or non-metal materials with physical parameters as follows:

a range of an elastic modulus E satisfies 0.1 GPa≤E≤220 GPa, a range of a Poisson's ratio η satisfies 0.25≤η≤0.5, and a range of a density ρ satisfies 800 $kg/m^3$≤ρ≤12,000 $kg/m^3$.

17. The thin-layer low-frequency underwater sound insulation metamaterial according to claim 16, wherein the metal materials comprise aluminum, carbon steel, or alloy steel; and the non-metal materials comprise polylactic acid or acrylonitrile butadiene styrene (ABS).

18. The thin-layer low-frequency underwater sound insulation metamaterial according to claim 1, wherein the cover plates and the sound insulation layer are integrally printed and manufactured using a three-dimensional (3D) printing technology.

19. The thin-layer low-frequency underwater sound insulation metamaterial according to claim 1, wherein the cover plates and the sound insulation layer are manufactured by wire cut electrical discharge machining (WEDM).

* * * * *